United States Patent [19]

Cole, Jr.

[11] Patent Number: 5,147,251
[45] Date of Patent: Sep. 15, 1992

[54] CHAIN DESIGN
[75] Inventor: Edward H. Cole, Jr., Ithaca, N.Y.
[73] Assignee: Borg-Warner Automotive Transmission & Engine Components Corporation, Sterling Heights, Mich.
[21] Appl. No.: 714,644
[22] Filed: Jun. 13, 1991
[51] Int. Cl.⁵ ............................................. F16E 13/00
[52] U.S. Cl. ..................................... 474/206; 474/212
[58] Field of Search ........................ 474/206, 212–217, 474/240, 242

[56] References Cited

U.S. PATENT DOCUMENTS

| | | |
|---|---|---|
| 690,317 | 12/1901 | Renold . |
| 1,638,139 | 4/1927 | Belcher . |
| 1,868,334 | 7/1932 | Morse . |
| 2,038,583 | 4/1936 | Maurer . |
| 2,475,264 | 7/1949 | Sutton . |
| 3,407,672 | 10/1968 | Keller . |
| 3,720,113 | 2/1973 | Van Doorne et al. . |
| 3,949,621 | 4/1976 | Beusink et al. . |
| 4,058,021 | 11/1977 | Wood . |
| 4,292,031 | 9/1981 | Rattunde . |
| 4,313,730 | 2/1982 | Cole, Jr. et al. . |
| 4,337,057 | 6/1982 | Horowitz et al. . |
| 4,342,560 | 8/1982 | Ledvina et al. . |
| 4,344,761 | 8/1982 | Steuer . |
| 4,386,921 | 6/1983 | Roberts . |
| 4,386,922 | 6/1983 | Ivey . |
| 4,392,843 | 7/1983 | Smit . |
| 4,428,740 | 1/1984 | Moore . |
| 4,464,152 | 8/1984 | Kern . |
| 4,498,892 | 9/1985 | Huntley . |
| 4,507,106 | 3/1985 | Cole, Jr. . |
| 4,512,754 | 4/1985 | Cole, Jr. et al. . |
| 4,516,931 | 5/1985 | Mott . |
| 4,516,964 | 5/1985 | Laister . |
| 4,516,965 | 5/1985 | Mott . |
| 4,526,559 | 7/1985 | Smirl . |
| 4,526,560 | 7/1985 | Swain . |
| 4,545,779 | 10/1985 | Sakakibara et al. . |
| 4,547,182 | 10/1985 | Rattunde . |
| 4,553,953 | 11/1985 | Bock . |
| 4,569,671 | 2/1986 | Ledvina . |
| 4,580,999 | 4/1986 | Ledford . |
| 4,581,000 | 4/1986 | Ferfecki . |
| 4,581,001 | 4/1986 | Rattunde et al. . |
| 4,618,338 | 10/1986 | Rattunde et al. . |
| 4,622,025 | 11/1986 | Kern et al. . |
| 4,631,042 | 12/1986 | Rattunde . |
| 4,645,479 | 2/1987 | Bateman et al. . |
| 4,650,444 | 3/1987 | Sakakibara et al. . |
| 4,650,445 | 3/1987 | Mott . |
| 4,655,732 | 4/1987 | Takashima . |
| 4,692,130 | 9/1987 | Novak . |
| 4,698,050 | 10/1987 | Hattori et al. . |
| 4,708,701 | 11/1987 | Cole, Jr. . |
| 4,710,154 | 12/1987 | Rattunde . |
| 4,718,880 | 1/1988 | Zimmer . |
| 4,737,137 | 4/1988 | Miyaishi . |
| 4,738,654 | 4/1988 | Cole, Jr. . |
| 4,758,210 | 7/1988 | Ledvina . |
| 4,764,158 | 8/1988 | Honda et al. . |
| 4,767,388 | 8/1988 | Tatara et al. . |
| 4,776,829 | 10/1988 | Yamamuro et al. . |
| 4,832,668 | 5/1989 | Ledvina et al. . |
| 4,871,344 | 10/1989 | Morisawa ...................... 474/212 X |
| 4,904,231 | 2/1990 | Zimmer . |
| 4,907,778 | 3/1990 | Schonnenbeck . |
| 4,927,404 | 5/1990 | Rattunde . |

Primary Examiner—Thuy M. Bui
Attorney, Agent, or Firm—Emch, Schaffer, Schaub

[57] ABSTRACT

A three-way laced chain (40) has a plurality of links (32, 43, 45) that are arranged in rows (A, B and C) that extend across the width of the chain (40) where similarly located end regions of the links (42, 43, 45) are offset. The links (42, 43, 45) that extends along the longitudinal center of the chain (40). A plurality of first (43), second (42) and third (45) links are positioned in substantially parallel relationship with respect to each other. The second links (42) have a thickness less than the first links (43) and the third links (45) have a thickness greater than the thickness of the first links (43). An aperture (49) is located at each end of the first (43), second (42) and third (45) links. A plurality of connecting elements (51) extend through the apertures (49) and connect together adjacent first (43), second (42) and third (45) links. The second links (42) and third links (45) are positioned in the chain (40) to vary the spacing between adjacent links (42, 43, 45) and to vary distribution of the loads on the links (42, 43, 45) whereby the loads on the links (42, 43, 45) are substantially balanced across the width of the chain (40) and bending of the connecting elements (51) is substantially reduced.

19 Claims, 8 Drawing Sheets

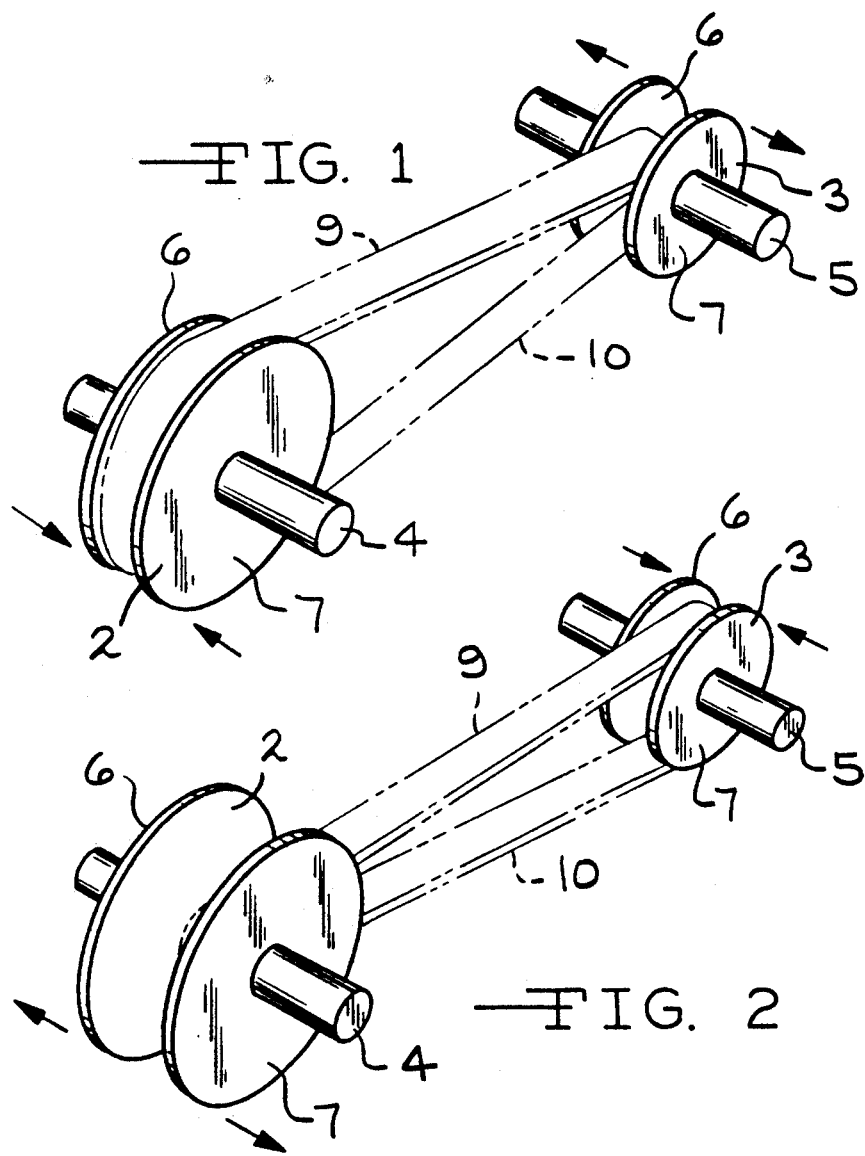

CHAIN DESIGN

TECHNICAL FIELD

This invention is directed to a chain and more particularly to a chain utilizing a three-way or three-link arrangement in its construction. The chain utilizes an improved link design which greatly enhances the strength of the chain. This chain is particularly well-suited for use in a continuously variable transmission (CVT) where the chain is used to connect two variable diameter pulleys. However, it should be noted that the chain construction of the present invention can be utilized with almost any type of chain.

BACKGROUND ART

The three-way lacing configuration, especially for CVT chains, has been known in the art. U.S. Pat. No. 4,547,182 discloses a three-way lacing arrangement for a chain that can be utilized in a constantly variable transmission where the links of the chain are located so that a line extending through the centers of gravity of neighboring transversely adjacent links forms an essentially straight line extending across the chain where the line is inclined with respect to the longitudinal axis of the chain. This reference also discloses a three-way lacing arrangement for a chain utilized in a CVT where the links are symmetrical around the centerline of the chain and a line extending through the center of gravity of neighboring transversely adjacent links forms a V or herringbone pattern in the chain. This reference appears to utilize conventional chain links in the construction of the three-way laced chain. In the '182 patent it is clearly stated that a two-way laced chain is stronger for a given size.

U.S. Pat. No. 4,927,404 discloses a link chain for use in an infinitely variable cone drive disk transmission. The link chain utilizes a three-way lacing configuration. In order to provide for uniform force transfer, some of the links are strengthened with respect to the normal or other links. The normal links are usually the interiorly located links in the link chain. The strengthening of the links can be obtained by using higher strength material, making the links thicker or doubling the links to form a double thickness link.

U.S. Pat. No. 4,581,001 discloses a chain for an infinitely variable cone-pulley transmission. The links of the chain are connected together by rocker pieces that fit into apertures in the links. Each link has two end webs spaced apart in the running direction of the chain and extending transverse to the running direction of the chain. The end webs are each adjacent to an aperture in the link. Each rocker piece is constructed to bear against a respective end web of each link at two abutment regions that are spaced apart in the direction in which the end web extends. The dimension of each rocker piece in the direction in which the associated web extends is substantially equal to the distance between the abutment regions.

It has been discovered, however, that the configuration of the links utilized in a three-way laced chain can greatly influence the strength of the chain and produce a three-way laced chain that is stronger than an identical sized chain utilizing two-way lacing. This is true even though the chain utilizing three-way lacing has one-third fewer links than an identical size chain utilizing two-way lacing. The construction for the links, therefore, greatly enhances the strength of a three-way laced chain and greatly expands the areas where the chain can be utilized.

DISCLOSURE OF INVENTION

A three-way laced chain (40) has a plurality of links (42, 43, 45) that are arranged in rows (A, B and C) that extend across the width of the chain (40) where similarly located end regions of the links (42, 43, 45) are offset. The links (42, 43, 45) are arranged in columns (53) that extend in the direction of travel of the chain (40). A plurality of first (43), second (42) and third (45) links are positioned in substantially parallel relationship with respect to each other. The second links (42) have a thickness less than the first links (43) and the third links (45) have a thickness greater than the thickness of the first links (43). An aperture (49) is located at each end of the first (43), second (42) and third (45) links. A plurality of connecting elements (51) extend through the apertures (49) and connect together adjacent first (43), second (42) and third (45) links. The second links (42) and third links (45) are positioned in the chain (40) to vary the spacing between adjacent links (42, 43, 45) and to vary the distribution of loads on the links (42, 43, 45) whereby the loads on the links (42, 43, 45) are substantially balanced across the width of the chain (40) and bending of the connecting elements (51) is substantially reduced.

BRIEF DESCRIPTION OF DRAWINGS

FIG. 1 is a perspective view of the chain of the present invention utilized in a continuously variable transmission (CVT).

FIG. 2 is a perspective view of the invention used in a CVT.

BEST MODE OF CARRYING OUT INVENTION

Figure 3:
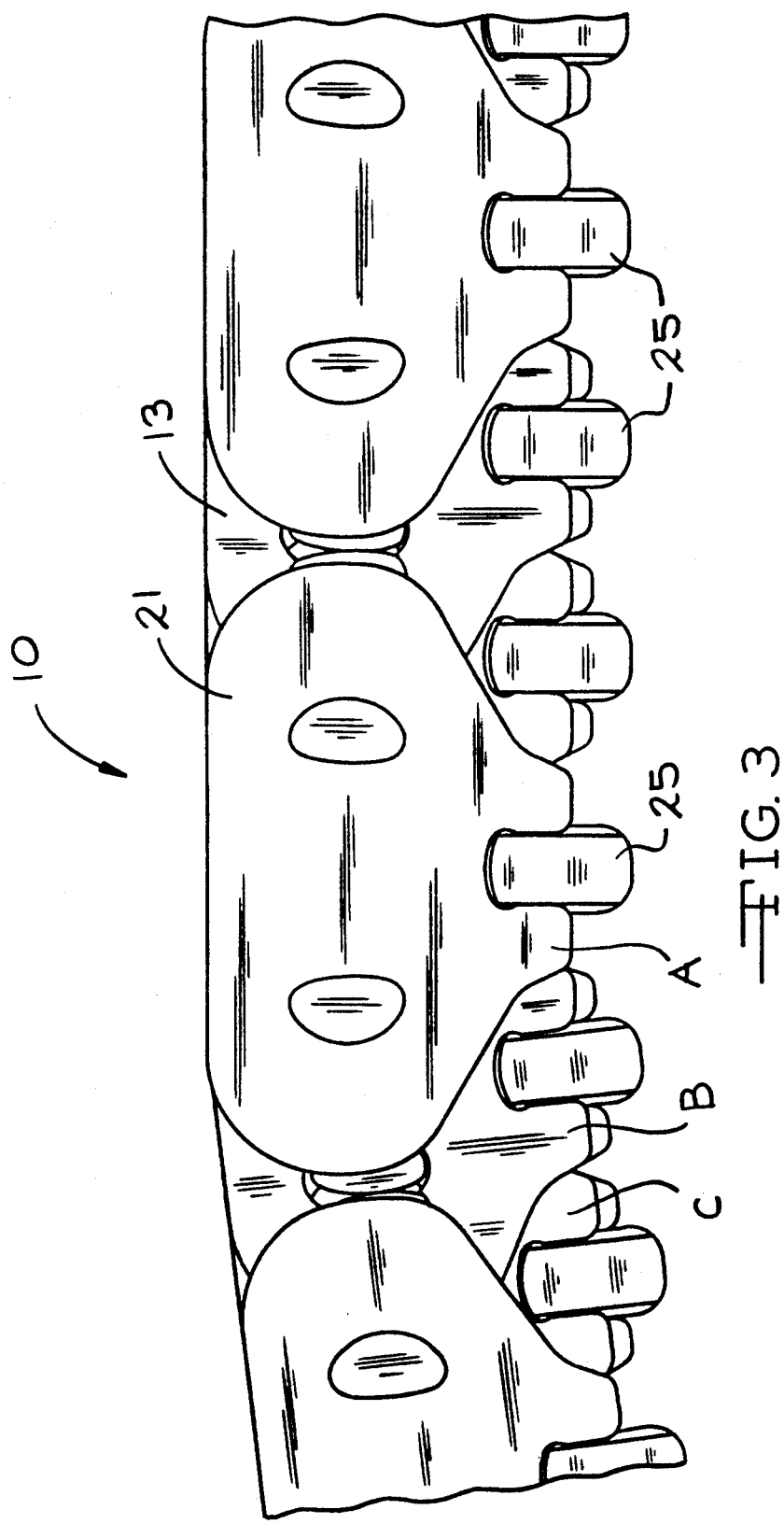
FIG. 3 is a side elevation view of the invention.

The invention is directed to an improved chain design and more particularly a chain utilizing a three-way or three-link arrangement in its construction. The chain utilized an improved link design which greatly enhances the strength of the chain. The details of the invention will be more readily understood by referring to the attached drawings in connection with the following description.

The chain 10 of the present invention is shown in FIGS. 1 and 2 being used in a continuously variable transmission (CVT). The CVT comprises a pair of pulleys 2 and 3 connected respectively to shafts 4 and 5. One of the shafts is a driven shaft and the other shaft is the drive shaft. Pulleys 2 and 3 comprise a pair of flanges 6 and 7 with at least one of the flanges being conical. The pulleys are connected by the chain 10 and the side edges 9 of the chain frictionally engage the pulley flanges. At least one flange of each pulley is axially moveable with respect to the others so as to vary the drive ratios between the two pulleys. The arrows indicate the axially movement of the flanges to effect different drive ratios. Means beyond the scope of this invention can be provided for axially moving at least one flange relative to the other. Although a CVT-type chain is shown in the drawings, it should be understood that this construction for a chain can be used with essentially any type of chain. Examples of other types of chain that can utilize this type of construction are shown in U.S. Pat. Nos. 4,342,560; 4,758,210; 4,832,668 and 4,904,231. These cited examples are only illustrative of types of chains that can utilize the features of the invention and are not meant to in any way limit the applications for the invention. The chain is also suitable for use for a three-way lacing arrangement that is symmetrical around the centerline of the chain and also for a chain that is not symmetrical. However, in many applications it has been found to be preferable to use a construction that is symmetrical around the centerline of the chain. Examples of how the links of a chain can be positioned to form these types of three-way lacing are shown in U.S. Pat. No. 4,547,182. The teachings of the '182 patent on how to arrange the links to produce a three-way laced chain are hereby incorporated by reference in this patent application.

Figure 6:
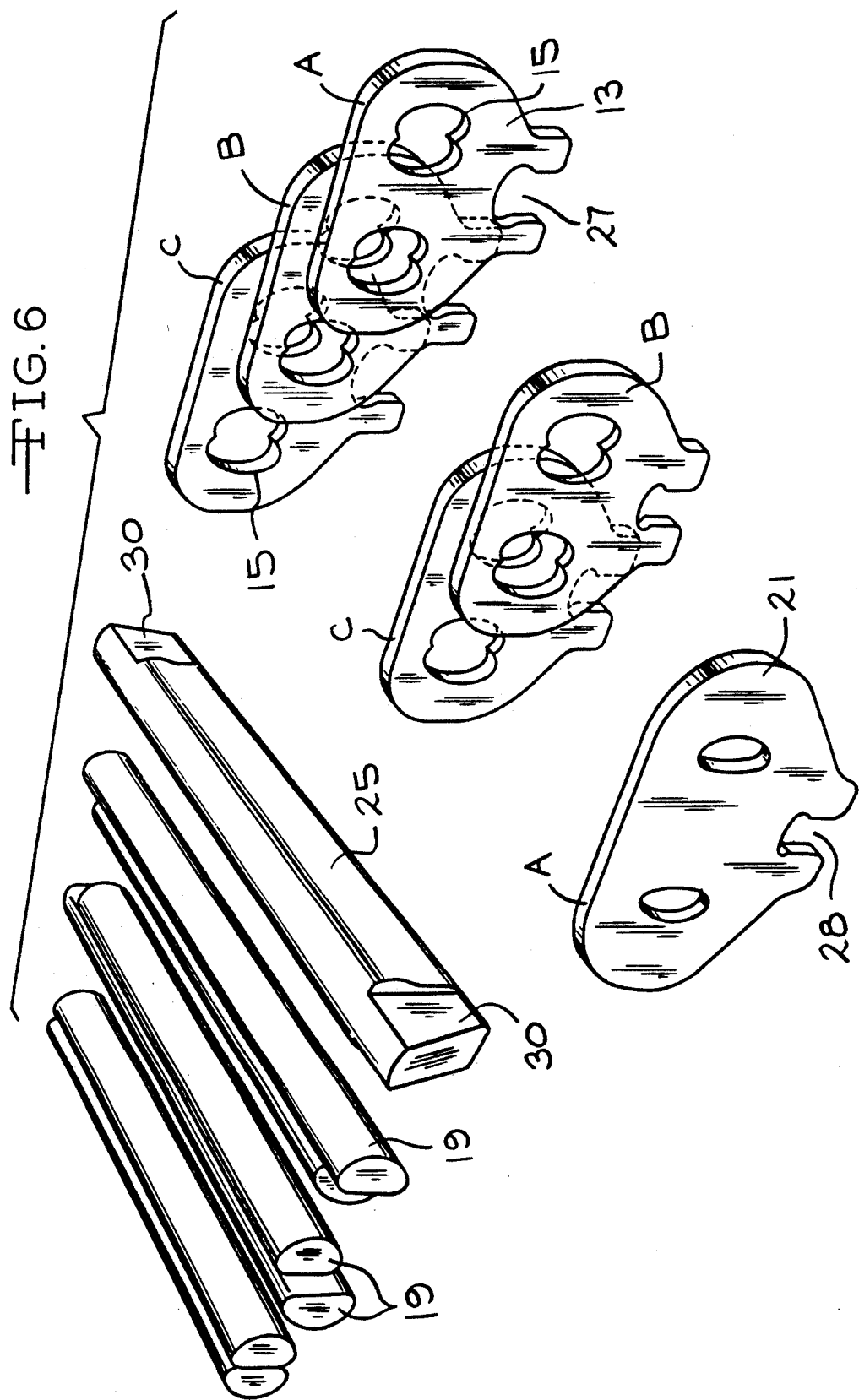
FIG. 6 is an exploded perspective view of the chain of FIG. 3.
Figure 14:
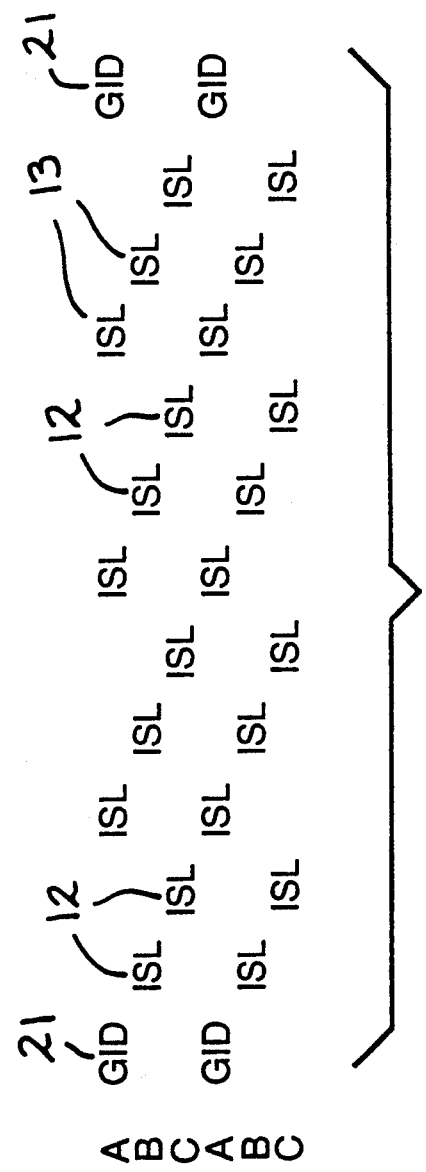
FIG. 14 is a diagramatic view of the chain of FIG. 3.

The chain 10 as shown in FIGS. 3, 6 and 14 is constructed for use with a continuously variable transmission (CVT). As shown diagramatically in FIG. 14, plurality of links 13 are placed in rows A, B and C extending across the width of the chain according to the three-way lacing arrangement. The links are also arranged in columns 12 that extend in the direction of travel for the chain 10. The three-way lacing arrangement shown is one that is symmetrical around the centerline of the chain and the transverse staggering pattern of the links 13 repeat for each three links rather than for each alternate link for a chain where all the links are positioned in line. It should be recognized that non-symmetrical three-way lacing constructions can also be used with this invention. A column of links 13 that extends along the length of the chain is positioned along the centerline of the chain. The three-way lacing arrangement also results in the rows A, B and C extending across the width of the chain 10 having a lacing pattern that repeats every third row. The rows A, B and C are arranged so that each row has a different width. In the drawing the A row is the widest as the outermost links 13 of the A row are on the extreme outside periphery of the chain 10. The B row is the next widest and the C row is the narrowest as the outermost links 13 are displaced the farthest from the outer periphery of the chain. It should also be noted that change in width for the rows A, B and C repeats every third row. The links 13 have an aperture 15 located adjacent each end of the links. The three-way lacing arrangement results in the aperture 15 on one end of the link 13 being in alignment with the aperture 15 on the opposite end of the adjacent link. In this construction the adjacent links 13 are never in the position where the ends of the links are in abutting end to end relationship. This construction results in one-third fewer links 13 being present for a given width of chain 10 than would be present in the same width of chain constructed with the links in an in-line arrangement with the ends of the links being in abutting relationship.

The links 13 are held together by connecting elements 19 which pass through the apertures 15 in the links 13. The stack of links 13 on the connecting elements 19 can be held in position by guidelinks 21 that are positioned on the outside of the stack of links and engage the connecting elements 19. As shown in FIG. 6, the connecting elements 19 are a pin and rocker arrangement but it should be understood that round pins or other suitable connecting elements can be utilized to connect the stacks of links 13.

Load blocks 25 can be positioned in a passageway 27 formed on one side of the links 13. The load blocks 25 are disposed in the passageway 27 so that the ends of the load blocks will engage the pulleys of the CVT. The guidelinks 21 usually have a passageway 28 that engages a notch 30 located on the end of the load blocks 25. The passageway 28 on the guide links fits in the notch 30 to hold the load block 25 in position in the passageway 27 formed on one side of the links 13. Frequently, the outside link in each row A, B and C will have a passageway 28 that fits in the notch 30 on the load blocks 25 to ensure that all the load blocks are retained in the passageway 27. The specific construction for the load blocks 25 does not form a part of this invention and additional details of this feature will not be provided.

Figure 7:
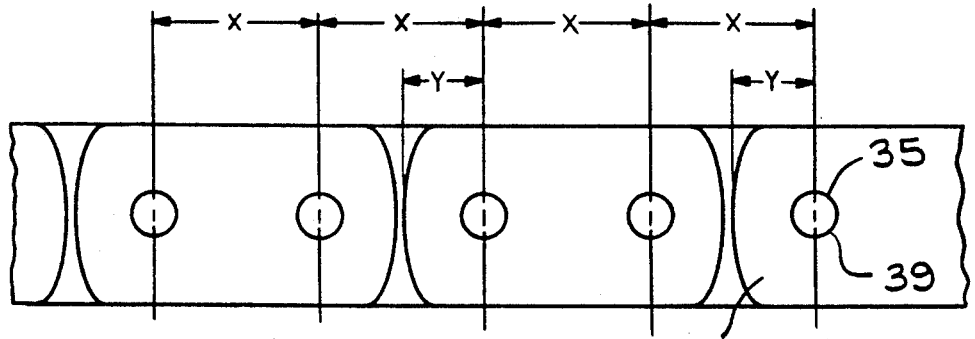
FIG. 7 is a side elevation view of a prior art chain.
Figure 8:
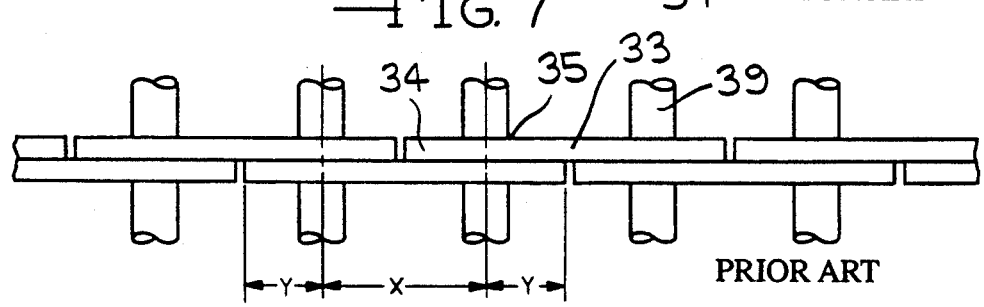
FIG. 8 is a plan view of the prior art chain of FIG. 7.
Figure 13:
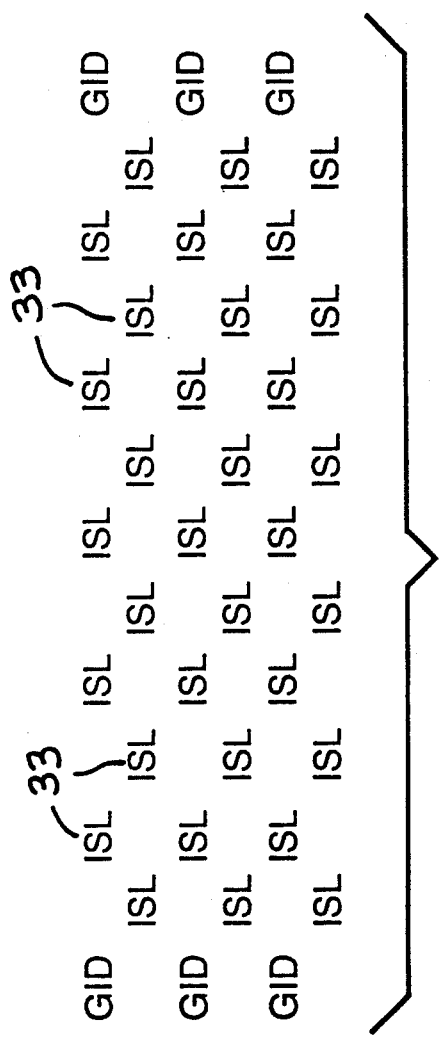
FIG. 13 is a diagramatic view of a prior art chain.

In FIGS. 7, 8 and 13 the prior art chain construction is shown where the links 33 are positioned in line with the end of a link in one row abutting the end of the link in the next row. The links 33 in adjacent rows are staggered in a brick-wall manner where the joints between adjacent links are offset one-half link. This is a very common construction that has been utilized for chains for many years. The pitch length of this chain is defined by the distance from a line passing through the center of one aperture 35 on a link to a line passing through the center of the other aperture 35 on a link. This distance is shown in FIG. 7 as the distance X. The distance X is substantially the same for all the links in the chain. The pitch of the chain or the distance X also defines the ability of the chain to articulate around a circular surface encountered when passing around a pulley or a sprocket. In practice it has been found that the shorter the distance X the more readily the chain will articulate and the quieter and smoother the chain will be as it passes around the circular surface. However, there is a balance between reducing the distance X or the pitch of the chain to achieve good articulation and smooth operation and increasing the cost of assembly for the chain and also reducing the strength of the chain. As can be seen in FIG. 7 the tensile forces placed on the links 33 are carried by the end region 34 of the link that extends from the centerline drawn through one aperture 35 to the adjacent end of the link. This distance is shown as the distance Y in FIG. 7. Since the links 33 in FIG. 7 are in abutting relationship, the distance Y will be less than one-half the distance X which is the pitch length of the chain. The distance Y is less than one-half the pitch length X to provide for some clearance between the ends of the adjacent links which are in abutting relationship. As the pitch of the chain is made smaller, this also means that there will be less material at the end of the links as defined by the distance Y to accomodate the forces placed on the links. If the pitch of the chain is reduced sufficiently, the end regions of the links will not have enough material to handle the axial loads placed on the links through the connecting elements 39. It is also possible to make the aperture 35 and connecting elements 39 smaller to provide more material in the end region 34 of the links 33. However, making the apertures and connecting elements smaller concentrates the tensile forces placed on the chain in a very small area and this can also lead to failures in either the links or connecting elements of the chain. Therefore there is always a design compromise to make sure that the pitch of the chain is long enough to provide enough material in the end region 34 of the links 33 for sufficient strength without making the chain unduly wide or producing a chain that is unacceptably noisey.

Figure 9:
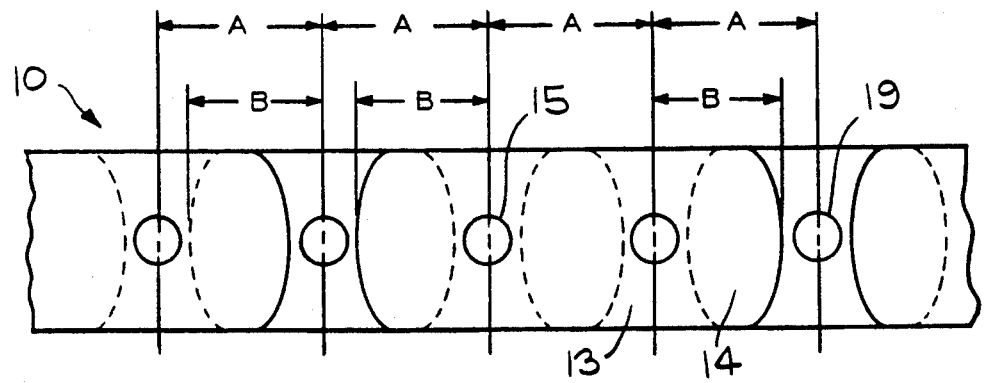
FIG. 9 is a side elevation view of the chain shown in FIG. 3.
Figure 10:
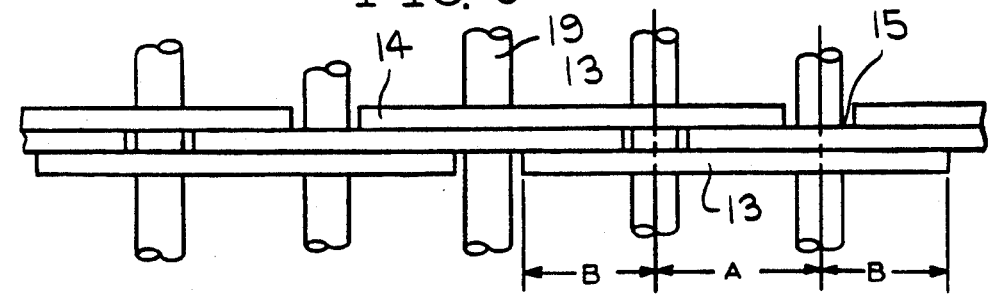
FIG. 10 is a plan view of the chain of FIG. 9.

In the present invention it has been discovered that the three-way lacing construction for a chain allows more material to be positioned in the end region of the links and this allows the links to be considerably stronger than the links used in an in-line construction as shown in FIGS. 7 and 8. FIGS. 9 and 10 show the benefit of this construction for a chain. In these figures, the pitch length of the chain 10 is the distance between the centerlines of the apertures 15 in the links 13. The pitch length is shown as the distance A in FIG. 9. The end region 14 of the links 13 that provide the load carrying capacity for the links is shown as the distance B in FIG. 9. Because the links 13 are not in abutting, in-line relationship, the end region 14 of the links 13 can extend essentially to the connecting element 19 that passes through the links on adjacent sides of the link 13. With this construction the length of end region 14 of the links 13, as defined by the distance B, can be a much larger percentage of the pitch length A for the links. Distance B is only one-half of the diameter of the aperture 15 plus a little clearance space shorter than the pitch length A. This is considerably larger than is possible with the end region Y for the prior art chain with an in-line link construction as shown in FIG. 7. Because the end region 14 of the links 13 shown in FIGS. 9 and 10 is considerably larger than the prior art links, the links of the present invention can accomodate much higher axially loads from the connecting elements 19. The end region 14 on the links 13 has a length that is from about 0.3 to about 0.6 the pitch length A of the link or the distance between the centers of the two apertures 15 on the links 13. In addition, because there is more material in the end region of the link, it is also possible to make the apertures 15 slightly larger so that there will be a larger radius over which the forces placed on the link by the connecting element 19 can be distributed. If larger apertures 15 are utilized in the links 13 then larger connecting elements 19 can be utilized and this further increases the load carrying capacity of the chain 10. In some instances when the size of the aperture 15 is increased it may be necessary to increase the height of the links to ensure there is sufficient material around the outer periphery of the aperture 15 to maximize the strength of the links 13.

In practice Applicant has found increasing the size of the end region 14 of the links 13 as shown in FIGS. 9 and 10 significantly increase the strength of the chain made from such links. There is a non-linear relationship between the increase in size of the end region 14 and the strength of the link 13. The added material in the end region 14 increases the strength of the link 13 to a much greater extent than would be expected. A chain with three-way lacing with the increased area on the end region 14 of the links 13 will be stronger than a chain having an in-line construction where the chains have the same width. This is true even though the chain with the three-way lacing pattern will have approximately one-third fewer links than the chain with the in-line construction. The increased material in the end region 14 of the links 13, that is possible using the three-way construction, results in links that are more than one-third stronger than the links that are used in an in-line construction for a chain. Incorporating a larger diameter for the aperture 15 in the links 13 to better distribute the loads from the connecting elements 19 and utilizing a larger diameter connecting element 19 further enhances the load carrying capacity of the chain 10 using the three-way lacing construction. The apertures 15 usually have a diameter from about 0.5 to about 0.75 of the length A. A three-way laced chain 10 using the links 13 of the present invention results in a lighter chain with fewer links that is also stronger than a chain using an in-line lacing patterns where both chains have the same pitch length and width. The three-way lacing construction utilizing the links 13 also provides another alternative where the pitch length of the chain can be reduced to provide a chain with better articulation characteristics that is less noisey to use while providing the same load carrying capacity as an in-line construction chain having a longer pitch length. Usually a chain using the improved links 13 in a three-way lacing pattern can have a pitch length from about 10% to about 25% shorter than the pitch length for a chain using an in-line construction while maintaining the same load carrying capacity as the in-line chain where both chains have the same width.

Figure 4:
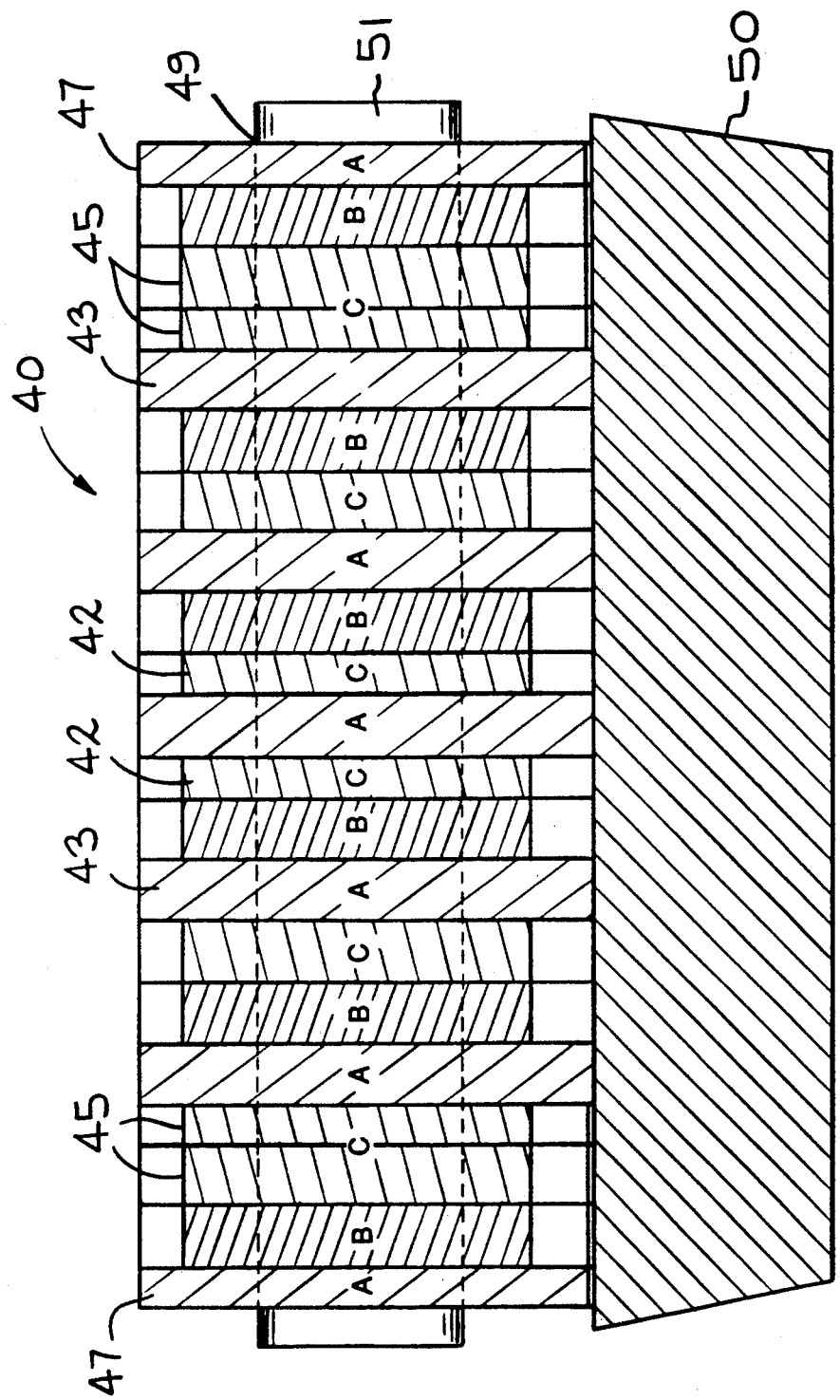
FIG. 4 is a cross-sectional view of an embodiment of the invention.
Figure 5:
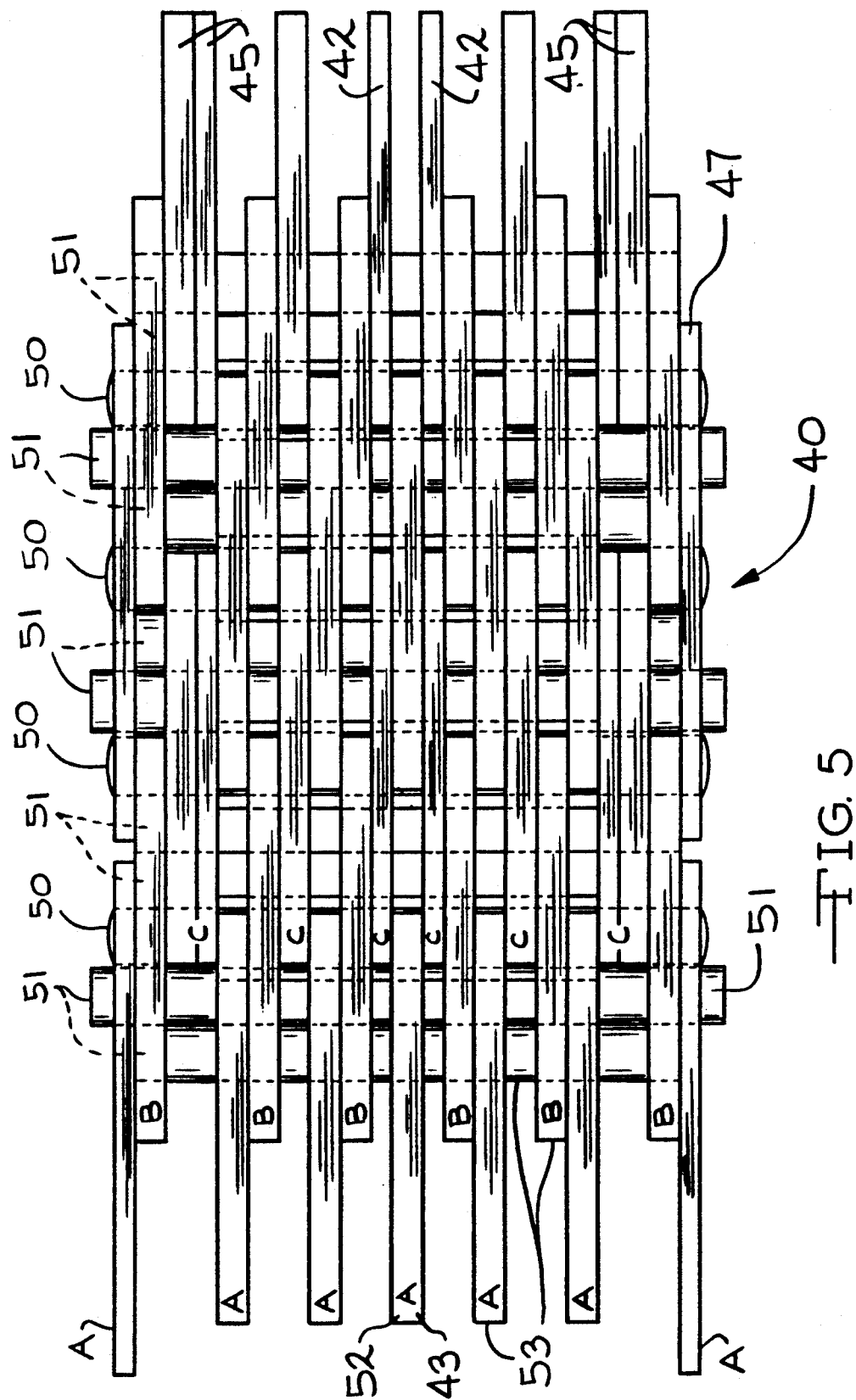
FIG. 5 is a plan view of the chain of FIG. 4.

FIGS. 4 and 5 show an embodiment of the present invention where links having varying thickness are utilized to balance the tensile forces across the width of the chain and across the width of the connecting elements.

In FIGS. 4 and 5 a chain 40 is shown utilizing a three-way lacing construction as previously discussed. The chain 40 is shown as being symmetrical about a centerline extending longitudinally along the chain. A plurality of links are arranged as previously discussed to form the chain 40. However, in this embodiment links having different thicknesses are utilized in the construction of the chain. There are standard links 43, thin links 42 and thick links 45 utilized in the construction of the chain 40. A column 52 of standard links 43 extends along the longitudinal centerline for the chain 40 and the chain is symmetrical around this column 52. In practice it has been found desirable for the thin links 42 to have a thickness from about ¼ to about ⅝ the thickness of a standard link 43 and the thick links 45 to have a thickness from about 1¼ to about 1⅝ the thickness of the standard link 43. In practice it has been found preferable for the thin links 42 to have a thickness approximately ½ the thickness of a standard link 43 and the thick links 45 to have a thickness approximately 1½ the thickness of a standard link 43. The thick links 45 are preferably made by combining a standard link 43 and a thin link 42 to form the thick link 45. Guidelinks 47 can be utilized on the exterior of the chain to hold the stacks of links in position as is known in the art. The guide links 47 will have a thickness that is appropriate for that region of the chain. The guidelinks 47 will usually have a thickness that corresponds to either a thin link 42, a standard link 43 or a thick link 45. The links have an aperture 49 located on each end and connecting elements 51 extend through the aperture 49 to hold the standard links 43, thin links 42 and thick links 45 together in rows A, B and C that extend across the width of the chain 40 as previously discussed. The links 42, 43, 45 are also disposed in columns 53 that extend in the direction of travel for the chain 40.

In evaluating the forces transmitted by the chain 40 it was discovered that the forces on the connecting elements 51 are not constant across the width of the chain. The three-way lacing construction creates gaps along the connecting elements 51 between adjacent links in a row. The size of the gaps will vary at certain points in a row due to the three-way lacing configuration. The gaps also contribute to the unequal forces on the connecting elements 51. Also the row A, B and C do not contain the same number of links and each row has a different load carrying capacity. All of these factors interact to produce uneven loads on the connecting elements 51 and uneven loads across a row of links in the chain 40. The loads on the connecting elements 51 can vary to an extent where the connecting elements 51 are caused to bend in actual use of the chain 40. Bending of the connecting elements 51 can place loads on the connecting elements 51 that can result in premature failure of the connecting elements or the links in the chain 40. To counteract these unbalanced forces it has been found desirable to vary the thickness of the links utilized in the chain 40 to balance the forces on the connecting elements 51.

In practice it has been found that using links having a varying thickness can reduce the uneven loads placed on the connecting elements 51 and significantly improve the load carrying capacity of the chain 40. The general purpose of using varying thickness links is to compensate for the variations in spacing between adjacent links in a row A, B and C that naturally occur in symmetrical three-way lacing construction for a chain. In using the varying thickness links 42, 43, 45, links that are closely spaced in a row can be made thinner as these links are closer together and do not carry as large of a load. Links that are widely spaced in a row can be made thicker as the widely spaced links will carry a higher load. Also thinner links 42 can be positioned in a row adjacent to links that are widely spaced to reduce the size of the gap between links in a row. If the gap is sufficiently reduced it may no longer be necessary to use thicker links 45 in that area of the row. In areas of the chain where there is a standard gap and there are no unusual loads exerted on the chain standard thickness links 43 can be utilized. In most applications it has been found that it is only necessary to have a thin link 42, a standard link 43 and a thick link 45 to accomodate the varying spacing between adjacent links in a row and the loads placed on the various links in a row.

Figure 11:
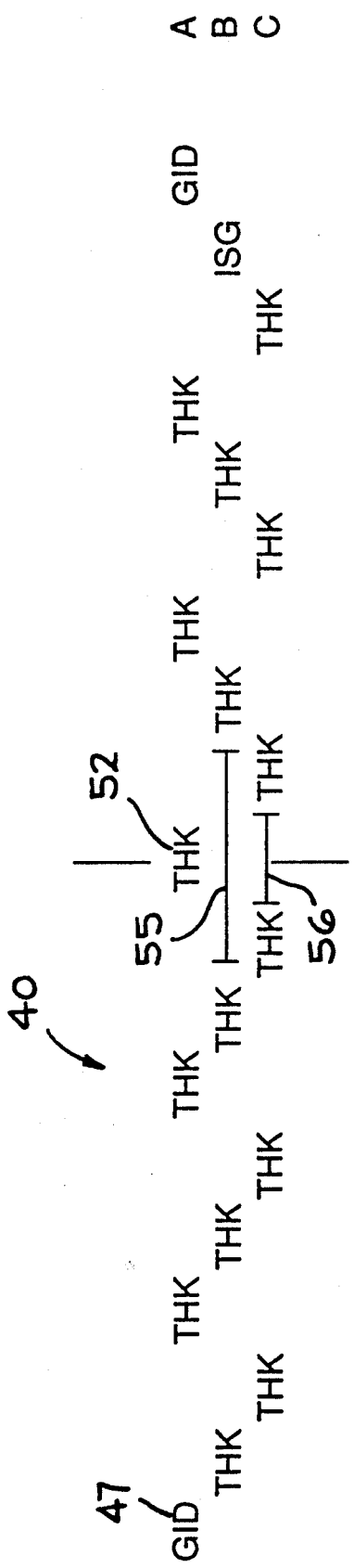
FIG. 11 is a diagramatic view of a prior art chain.

An example will more clearly indicate how utilizing varying thickness links greatly improves the load carrying capacity of a chain 40 that utilizes the three-way lacing construction. FIG. 11 shows a prior art chain utilizing standard thickness links in a construction of the chain. This chain is constructed so that it is symmetrical and there is a column 52 of links that extend along the centerline of the chain. For the sake of simplicity only rows A, B and C are shown for this chain. However, it should be understood that rows A, B and C would be repeated along the entire length of the chain. In this prior art chain row A has seven evenly spaced links and this is one more links than either the B or C row contains. Accordingly, this row of links is stronger than the other two rows of links and is under-utilized in the chain. Also it should be pointed out that the guidelinks 47 at the outside edges of the A row are under-utilized. The guidelinks are on the outside edge of the chain 40 and the connecting elements 51 terminate at the guidelinks. Since the guidelinks are at the outer edge of the chain there is no additional load present on the outside of the guidelinks. This reduces the loads the guidelinks must carry and the guidelinks are under-utilized. It should be noted that the under-utilized A row will be repeated along the length of the chain every third row. The B row of the prior art chain construction has six standard-thickness links. However, there is a wide gap 55 between the two links in the center of this row because there are three standard-thickness links present between the two center links. The other links in the B row, the links in the A row and most of the links in the C row have only two links between adjacent links in the row. The wide gap 55 causes a higher load to be placed on these two center links and causes these two center links to be overloaded. The overloading of the center links can cause undue bending of the connecting elements in this area of the chain. The C row of this prior art chain has six standard thickness links. However, the two center links in the C row are positioned very close together as there is only one link, the links in column 52 that extends along the centerline of the chain 40, that separates the two center links in the C row. Because the two center links have a small gap 56 between the links, these links are under-utilized and do not carry as much load as most of the other links in the chain 40. The outer two links in the C row have two overhanging links from the A and B row that extend to the outer edge of the chain 40. This construction causes the two outer links of the C row to be overloaded. Thus, the C row has under-utilized links in the center and overloaded links on the outer edge. As can be seen from this evaluation of the prior art three-way laced chain, there are patterns of under-utilized and over-utilized links that are present in the A, B and C rows of the chain. This does not allow the load carrying capacity of the chain to be maximized and can also result in undue bending of the connecting elements 51 which can further reduce the load carrying capacity of the chain 40.

Figure 12:
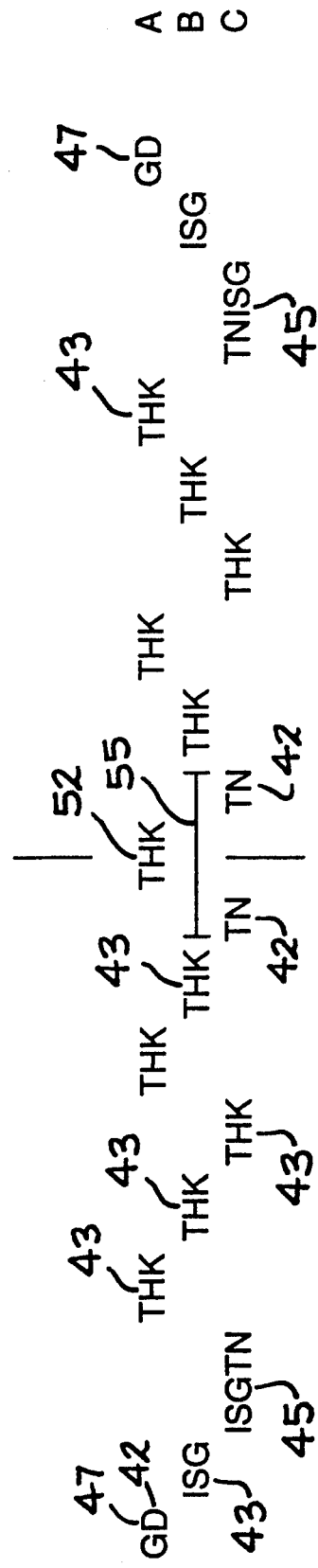
FIG. 12 is a diagramatic view of the chain of the present invention.

An example of how the present invention can overcome the deficiencies set forth with regard to the prior art chain of FIG. 11, please refer to FIG. 12 where the varying thickness links of the present invention are utilized. In this figure, the A row has seven links but it should be noted that the guidelinks 47 are now thin links 42 because the guidelinks do not carry as much load as the other links in this row. The remainder of the links in the A row are standard links 43 so this row really has the equivalent of 6 and one-third regular links because thinner links 42 are utilized for the guidelinks 47. The C row shown in this figure has six links but the C row now has two thick links 45 and two thin links 42 so that this row now has the equivalent of 6 and two-thirds standard thickness links 43. The two center links in the C row which are adjacent the center column 52 of links are thin links as these closely spaced links were previously under-utilized and thinner links can be positioned in this portion of the chain without reducing the load carrying capacity of the chain. The two outer links of the C row are thick links 45 as these links were previously overloaded in the prior art chain. Making the outer links in the C row thicker will allow these links to handle the loads present in this portion of the chain and these links will no longer be overloaded. As discussed previously the row A, B and C of the chain 40 vary in width. In FIG. 12 the C row is shown as being the narrowest row and the outer most links of this narrowest row is where the thicker links 45 are to be positioned as these links are subjected to higher loads than the outer links of the other two wider rows of links. The B row shown in this figure has six regular thickness links 43 with a nearly even spacing. The spacing between the two central links in the B row is only slightly wider than normal because the two thin links 42 in the C row reduce the size of the gap 55 between the two center links of the B row. The spacing between the outer links of the B row and the next inside links in the B row is somewhat wider than normal because of the thick links utilized at the outside of the C row. However, this situation is somewhat mitigated by the fact that the guidelinks 47 on the outside of the A row are thin and this places the outside links in the B row closer to the outer edge of the chain 40 and results in a lower load being placed on the outer links of the B row.

The three-way lacing construction shown in FIG. 12 results in a very significant reduction in the under-utilization and overloading of the links in the rows of the chain. This construction also reduces the variation and the spacing between the links in a particular row to further enhance the load carrying capacity of the links. Because the links are being utilized more effectively this reduces the uneven loading on the connecting elements 51 which reduces the bending of the connecting elements and further enhances the load carrying capacity of the chain 40.

It should be understood that the above example is only meant to illustrate the principles of the present invention. Changing the width of the chain 40 can alter which links are under-utilized or overloaded in a particular row of the chain. However, the underlying principles of utilizing varying thickness links can be utilized to maximize the load carrying capacity of the chain. When making a decision on whether to utilize thin links or thick links it is particularly important to utilize the thick 45 and thin 42 links in a manner where each row of the chain has substantially the same cross-sectional thickness of links. If there is a choice between using thin links 42 to reduce the gap between adjacent links in a row or utilizing a thick link 45 to handle the additional loads, it is usually best to select the approach that results in rows of the chain having the most equal total cross-sectional thickness of links present in each row. It is also desirable to construct the chain to minimize the bending stresses on the connecting elements 51. However, utilizing the thin 42 and thick 45 links as set forth above usually helps to minimize the bending stresses on the connecting elements and also keeping the total cross-sectional thickness of links each row as equal as possible also usually helps to reduce the bending stresses. Occasionally, the width requirements for a particular chain may influence the decision on how the thick and thin links should be utilized in the chain. To obtain a particular width for a particular end use application it may be necessary to utilize the thick and thin links in a manner that does not produce as high of load carrying capacity for the chain 40. However, utilizing the thick and thin links of the present invention will still allow a chain to be constructed having a higher load carrying capacity with less bending of the connecting elements 51 than in the prior art three-way lacing chains utilizing only a single thickness link.

The above description is given for the sake of explanation of the invention. Various modifications and substitutions, other than those cited, can be made without departing from the scope of the invention.

I claim:

1. A three-way laced chain (40) having a plurality of links (42, 43, 45) arranged in rows (A, B, C) extending across the width of said chain (40) in which similarly located end regions of said links (42, 43, 45) are offset and said links (42, 43, 45) being arranged in columns (53) extending along the direction of travel for said chain (40) comprising:

a plurality of first (43), second (42) and third (45) links positioned in substantially parallel relationship with respect to each other, said second links (42) having a thickness less than said first links (43) and said third links (45) having a thickness greater than said first links (43);

an aperture (49) located at each end of said first (43), second (42) and third (45) links;

a plurality of connecting elements (51) extending through said apertures (49) and connecting together adjacent first (43), second (42) and third (45) links, said second links (42) and said third links (45) are positioned in said chain (40) to vary the spacings between adjacent links (42, 43, 45) and to vary the distribution of loads on said links (42, 43, 45) whereby said loads on said links (42, 43, 45) are substantially balanced across the width of said chain (40) and bending of said connecting elements (51) is substantially reduced.

2. The chain (40) of claim 1, wherein said second links (42) can be combined with said first links (43) to form said third links (45).

3. The chain (40) of claim 1, wherein said columns (53) of said links (42, 43, 45) are arranged symmetrically around a center column (53) of links (42, 43, 45) that extend along the longitudinal centerline of said chain (40).

4. The chain (40) of claim 3, wherein said center column (52) is formed of first links 43.

5. The chain (40) of claim 1, wherein said third links (45) are positioned adjacent the outer periphery on each side of said chain (40).

6. The chain (40) of claim 5, wherein said row (A, B, C) of links (42, 43, 45) vary in width and said rows (A, B, C) are arranged to repeat every third row (A, B, C).

7. The chain (40) of claim 6, wherein said third links (45) are positioned in said outermost columns (53) of said narrowest row (A, B, C) of said chain (40).

8. The chain (40) of claim 3, wherein a second link (42) is positioned in said column (53) on each side of said center column (52) of first links (43) positioned along said centerline of said chain (40).

9. The chain (40) of claim 1, wherein said second links (42) have a thickness that is from about ⅓ to about ⅔ the thickness of said first links (43) and said third links (45) have a thickness that is from about 1⅓ to about 1⅔ the thickness of said first links (43).

10. The chain (40) of claim 9, wherein said second links (42) have a thickness that is substantially ½ the thickness of said first links (43) and said third links (45) have a thickness that is substantially 1½ the thickness of said first links (43).

11. The chain (40) of claim 1, wherein said second links (42) and third links (45) are positioned in said chain (40) so that each row (A, B, C) of links (42, 43, 45) extending across said chain has substantially the same cross-sectional thickness of links (42, 43, 45) present in each of said rows (A, B, C).

12. A three-way laced chain (40) having a plurality of links (42, 43, 45) arranged in rows (A,B,C) extending across the width of said chain (40) in which similarly located end regions of said links (42, 43, 45) are offset and said links (42, 43, 45) being arranged in columns (53) extending along the direction of travel for said chain (40) comprising:

a plurality of first (43), second (42) and third (45) links positioned in substantially parallel relationship with respect to each other, said second links (42) having a thickness from about $\frac{1}{3}$ to about $\frac{2}{3}$ the thickness of said first links (43) and said third links (45) having a thickness from about $1\frac{1}{3}$ to about $1\frac{2}{3}$ the thickness of said first links (43);

an aperture (49) located at each end of said first (43), second (42) and third (45) links;

a plurality of connecting elements (51) extending through said apertures (49) and connecting together adjacent first (43), second (42) and third (45) links, said first 943), second (42) and third (45) links being positioned in said chain (40) whereby said second links (42) and said third links (45) are positioned in said chain (40) to vary the spacing between adjacent links (42, 43, 45) and to vary the loads on said links (42, 43, 45) and said connecting elements (51) in areas of said chain (40) whereby said loads on said links (42, 43, 45) are substantially balanced across the width of said chain (40) and bending of said connecting elements (51) is substantially reduced, said second links (42) and third links (45) being positioned in said chain (40) so that each row (A,B,C) of links (42, 43, 45) extending across said chain has substantially the same cross-sectional thickness of links (42, 43, 45) present in each of said rows (A,B,C).

13. The chain (40) of claim 12, wherein said second links (42) are combined with said first links (43) to form said third links (45).

14. The chain (40) of claim 12 wherein said columns (53) of said links (42, 43, 45) are arranged symmetrically around a center column (52) of links (42, 43, 45) that extends along the longitudinal centerline of said chain (40).

15. The chain (40) of claim 14, wherein said center column (52) is formed of first links (43).

16. The chain (40) of claim 15, wherein a second link (42) is positioned on each said of a column (52) of first links (43) positioned along said centerline of said chain (40).

17. The chain (40) of claim 12, wherein said rows (A, B, C) of links (42, 43, 45) vary in width and said rows (A, B, C) are arranged to repeat every third tow (A, B, C).

18. The chain (40) of claim 17, wherein a third link (45) is positioned in said outermost columns (53) of said narrowest row (A, B, C) of said chain (40).

19. The chain (40) of claim 12, wherein said second links (42) have a thickness that is from about one-third to about two-thirds the thickness of said first links (43) and said third links (45) have a thickness that is from about one and one-third to about one and two-thirds the thickness of said first links (43).

* * * * *